July 15, 1969 D. M. COLLINS 3,456,237

DESKEWING SYSTEM

Filed Aug. 26, 1965 6 Sheets-Sheet 1

DAVID M. COLLINS
INVENTOR.

BY

Griffin and Branigan
ATTORNEYS

July 15, 1969 D. M. COLLINS 3,456,237

DESKEWING SYSTEM

Filed Aug. 26, 1965 6 Sheets-Sheet 3

3,456,237
DESKEWING SYSTEM

David M. Collins, St. Paul, Minn., assignor to Sperry Rand Corporation, New York, N.Y., a corporation of Delaware Filed Aug. 26, 1965, Ser. No. 482,795
Int. Cl. G08b *29/00;* G06f *11/00;* G11b *5/00*
U.S. Cl. 340—146.1 15 Claims

ABSTRACT OF THE DISCLOSURE

The disclosure relates to a system for deskewing data characters received via parallel lines so as to retransmit the deskewed data characters in bit parallel fashion. The device employs a plurality of deskew registers and the correctable skew error depth is limited only by the number of deskew registers. The device requires no counters for controlling read-out of the registers and the data is not gated from rank to rank in the deskew registers.

This invention relates to a system for deskewing data characters received via parallel lines so as to retransmit said deskewed data characters in bit parallel fashion.

In data processing and communication systems operating in the parallel mode, wherein the bits of a multibit character are received each on a separate input line and where multibit characters are transmitted serially one behind the other, there is quite often the problem of a skewed arrangement of the character bits such that one or more bits of one or more subsequently transmitted characters are received by the system prior to receipt of all bits of a preceding transmitted character. In other words, the bits belonging to the same character do not arrive at the same time at the utilization means. In this case, it is necessary to identify bits belonging to the same character and retransmit same simultaneously if such have been received at varying times from the input lines. Skewed data of this nature may originate from a storage device such as magnetic tape or drum, or from any other originating unit. Thus, it has been common in the prior art to provide a so-called "deskewing" circuit for asynchronously receiving parallel data character bits so as to send them to the utilization means character by character, with each character having its bits transmitted simultaneously from the deskew circuit.

The present invention provides an improvement over prior art deskew circuits in that data is successively gated into and out of a plurality of skew registers without a requirement for read-in and/or read-out counters. By virtue of means sensing the filled and unfilled conditions of two adjacent register positions, the entry of an information bit into the proper register position can be completely assured, and overskew errors can be easily detected. The invention also requires a loaded condition of the succeeding adjacent register to govern readout of a register, and one species of the invention also utilizes the deskew registers as input buffer registers for the central system by providing means to check the status of both the immediately preceding and succeeding registers before data in a register is read out unloaded. Furthermore, data bits of a particular character, when received by a particular skew register, are not thereafter required to be transferred between skew registers of the circuit before being gated to the utilization means. Skew in the present system need not be compensated for by use of tapped delay lines which inherently are subject to temperature variations. Other features of the present invention permit the correctable skew error depth to be limited only by the number of deskewing registers, there being one such deskew register for each character whose bits might arrive before arrival of all bits of a preceding character. Within the maximum limits of anticipated skew error, said error may be continuously varying so that no initial or periodic adjustments are required.

Therefore, it is one object of the present invention to provide an improved and simplified deskewing circuit operating upon bits arriving in parallel of transmitted characters, and having novel overskew detecting means.

A further object of the invention is to provide a deskewing circuit requiring only a plurality of deskew registers and control gates therefor, without need for additional complex counter configurations, and novel control circuits for properly energizing said control gates.

Another object of the invention is to provide plural deskew register positions for each information channel, where each deskew register position includes means to permit data entry therein only when the immediately preceding register position is full and the immediately succeeding register position is empty.

One more object of the present invention is to provide plural deskew registers where each, after being loaded with a character, is not capable of being read out until at least the succeeding register is also loaded.

An additional object of the present invention is to provide plural deskew registers where each, after being loaded with a character, is not capable of being read out until both the preceding register is empty and the succeeding register is loaded.

These and other objects of the present invention will become apparent during the course of the following description, to be read in view of the drawings, in which:

FIG. 3 shows details of one Input Control circuit;

FIG. 4 shows a simplified block diagram of the arrangement of the deskewing registers and skew register rank control circuits;

FIG. 5 shows details of a deskew register stage or cell;

FIG. 6 shows details of a rank control circuit;

FIG. 7 shows a block diagram of the overskew error detection unit;

FIG. 8 shows details of an overskew error circuit;

FIG. 9 shows details of part of the external control circuit for generating certain control signals used in the deskew system.

GENERAL DESCRIPTION

Figure 1:
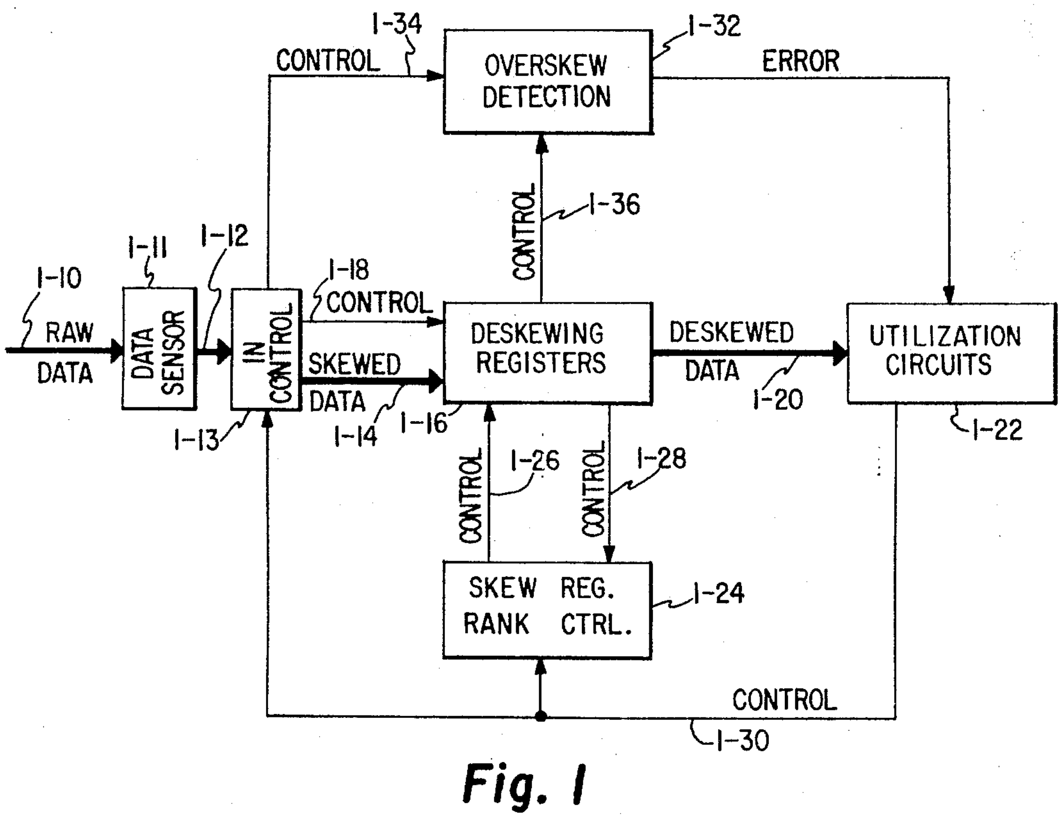
FIG. 1 is an overall block diagram showing the various units of the system.
Figure 2:
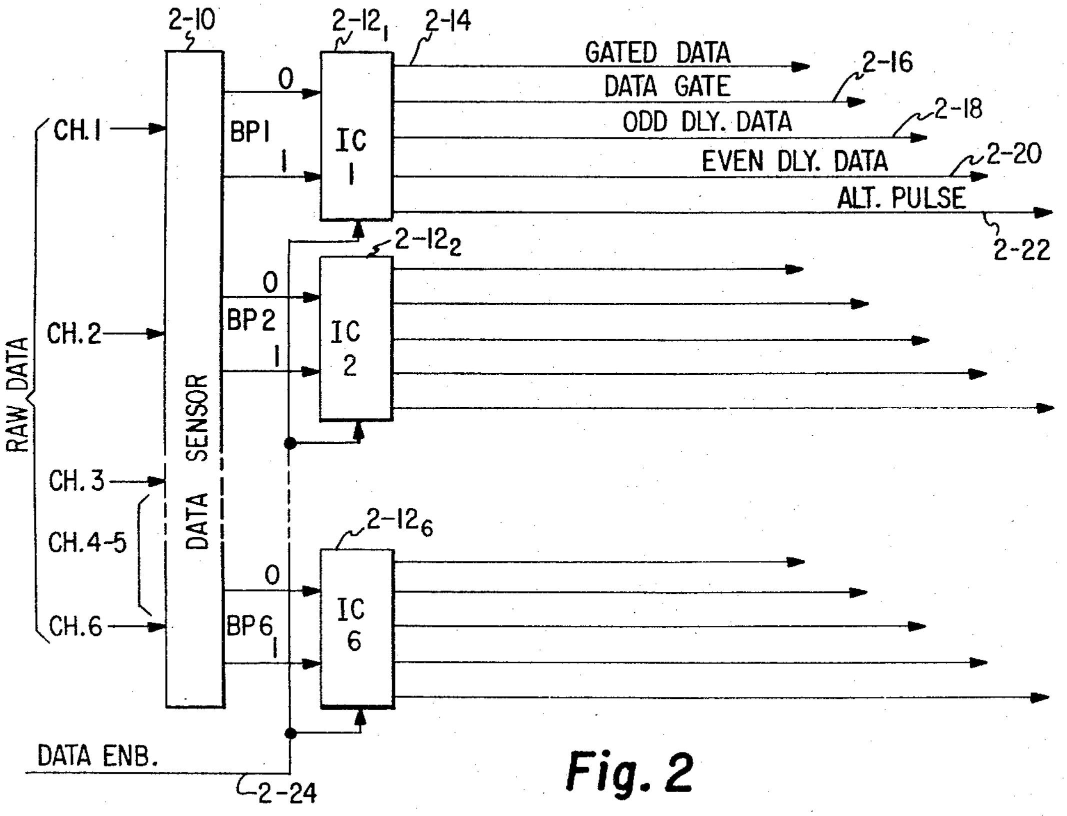
FIG. 2 shows a simplified block diagram of the basic In Control unit of FIG. 1.

The block diagram of FIG. 1 shows the basic deskewing system as being comprised of several logical subdivisions which function generally as follows: Raw data from some originating unit (not shown) is supplied via one or more input leads 1–10, Data Sensor unit 1–11, and parallel leads 1–12 to an In Control unit 1–13, where the data is then buffered and transmitted via parallel communication lines 1–14 to an arrangement of deskew registers 1–16. Certain necessary control signals are also sent from In Control 1–13 via communication lines 1–18. In a typical environment, the input communication link 1–10 takes the form of an individual channel for each of the bits in the data character as is best shown in FIG. 2 subsequently described, however, this is not necessary if Data Sensor 1–11 can convert other types of raw data, e.g. analog, etc., into parallel bits on lines 1–12. The skewed data channel 1–14 always takes the form of plural channels one for each bit position of the arriving characters, such that the character bits are transferred in parallel between unit 1–13 and registers 1–16. Each Deskewing Register receives the bits of a same character to hold same until the entire character is assembled and thus can be transmitted, bit parallel, via communication channels 1–20 to the utilization circuit represented by block 1–22 in FIG. 1.

To control entry of the skewed data bits from channels 1–14 into various ones of the deskewing registers, a Skew Register Rank Control circuit 1–24 is provided having control communication paths 1–26 and 1–28 both to and from the deskew register arrangement 1–16. Both the In Control unit 1–13 and the Skew Register Rank Control Unit 1–24 receive control signals by a path 1–30 from the utilization circuit. The final basic logical subdivision in the deskew system is Overskew Detection represented by block 1–32. The circuits here receive control signals via path 1–34 from unit 1–13 and also via path 1–36 from the Deskew Register arrangement. An error indication is transmitted to the utilization circuits if the number of successively appearing skewed characters is larger than the number of deskew registers 1–16 such that system capacity is exceeded.

Certain specific units of the deskewing system comprising the invention will now be considered in detail beginning with FIG. 2 which generally shows the major subdivisions of the In Control unit 1–12 in FIG. 1. Here, the raw data communication link takes the form of an individual channel for each bit position of the serially transmitted characters, there being six such channels shown numbered 1 through 6 for the purpose of illustration only. Each of these channel leads may, for example, come from a read head of a magnetic tape system such that a signal indication appears thereon representative of either a 0 or a 1 bit value. These channels 1 through 6 are connected to a data sensor indicated by block 2–10 which is used to interpret the raw data signals and thus produce, for each input channel, a pulse on one of two output leads representing either a 0 or 1 bit value. Each pair of output leads from Data Sensor 2–10 is labelled BP1, BP2, etc. to indicate the particular bit position of the characters with which it is identified. The exact construction of data sensor 2–10 is dictated by the nature of the raw input data thereto on channels 1 through 6 and forms no part of the present invention. For example, data sensor 2–10 could be of a type receiving several bits of a data character in an encoded signal form on but one input channel, with said data sensor thereafter decoding the signal and producing separate 0 and 1 outputs for each bit thereby represented.

Each bit position channel from the data sensor, comprised of two output leads respectively indicating the 0 and 1 values, is connected to an individual Input Control circuit 2–12 respectively identified by an IC number. Thus, six such circuits are shown in FIG. 2 labelled IC1, IC2, etc. Input control circuits IC3, 4, and 5 are not actually shown in FIG. 2 for the purpose of drawing simplicity, but are assumed to be present. Each IC circuit has one data output line 2–14 labelled Gated Data which transmits a pulse thereon for each 1 bit received from the Data Sensor, and no pulse for a received 0 bit. Each IC circuit further generates four control signals at various times upon four individual output leads numbered 2–16, 2–18, 2–20, and 2–22. The control signal on lead 2–16 is labelled Data Gate, that on lead 2–18 is labelled Odd Delay Data, that on lead 2–20 is labelled Even Delayed Data, and that on 2–22 is labelled Alternate Pulse. Applied to each IC circuit is a pulse on lead 2–24 entitled Data Enable from the utilization circuit in order to permit operation of the IC circuits at the commencement of raw data transmittal to the deskewing system.

FIRST EMBODIMENT

FIGS. 3 through 9 show the logical organization of a first preferred embodiment of the invention. Elements employed therein, such as bistable flip-flops (FF), logical AND (A) and OR(O) gates, complementing trigger elements (T) and sequencers are well known in the computer art. For purposes of this disclosure, the setting of a flip-flop to its "0" indicating stable state (by a positive or high input signal) makes relatively high the electrical signal at its "0" output terminal and makes relatively low the electrical signal at its "1" output terminal. Conversely, a flip-flop in its "1" stable state generates relatively high and low signals from its "1" and "0" output terminals, respectively. An AND gate disclosed in FIGS. 3–9 generates a relatively high output electrical signal when all signal inputs thereto are high, while an OR gate generates a high output electrical signal for one or more high input signals. A trigger element T, when supplied with a positive going signal at its center input, changes from one bistable state to the other, and in effect is a single binary counting stage.

Figure 3:
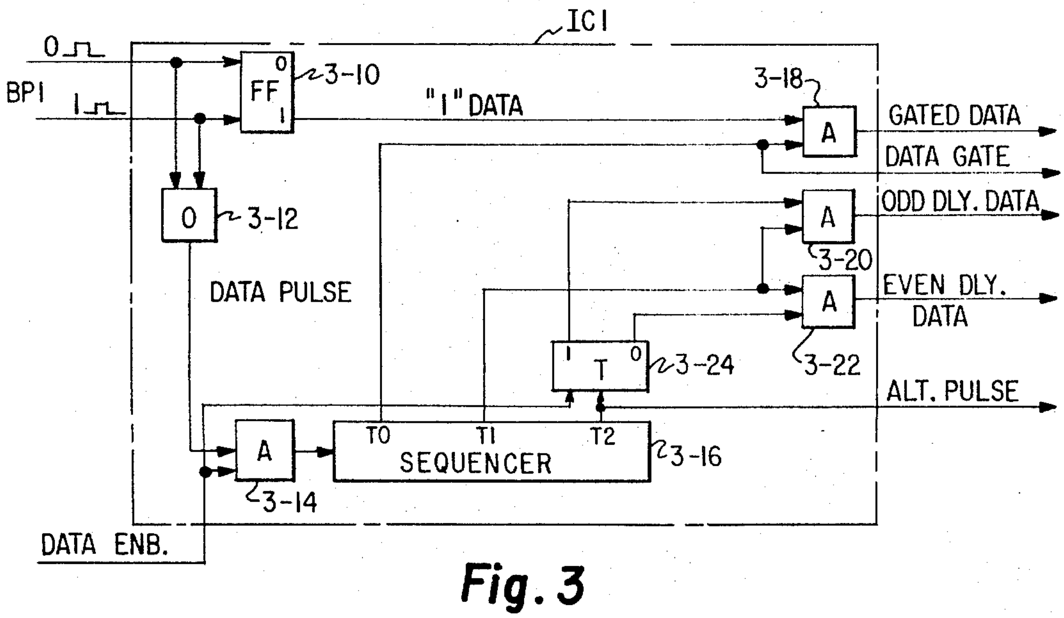

Details of each IC circuit in FIG. 2 for the first embodiment are shown in FIG. 3. A 0 bit indicating pulse appearing from the bit position BP output of the Data Sensor is applied to set a flip-flop 3–10 to a bistable state indicating a 0 value, whereas a pulse representing value 1 sets said FF3–10 to its other bistable state to indicate said 1 value. Both the 0 pulse and 1 pulse also is transmitted via an OR gate 3–12 to one input of an AND gate 3–14. If an applied Data Enable signal from the utilization circuit is present at the other input of A3–14, then an output pulse is obtained therefrom which is applied to an Initiate input of a Sequencer unit 3–16 each time that a 0 or a 1 pulse appears from the Data Sensor to the IC circuit. Sequencer 3–16, upon receiving a pulse from A3–14, produces in sequence and without overlap three successive pulses each from a different one of three outputs labelled T0, T1, and T2 in that order. Sequencer 3–16 may in fact be a typical pulse delay line tapped at three different points along its length such that a pulse from A3–14, upon entering the delay line, appears successively at the T0, T1, and T2 outputs during its travel therethrough. Other forms of a sequencer may be employed such as a three output ring counter whose operation is automatically started by the pulse from A3–14. In any event, the total time required to generate the three successive T0, T1, T2 pulses from Sequencer 3-16 should be less than the time interval between adjacent pulses arriving at the IC circuit from the Data Sensor.

The T0 pulse output from Sequencer 3–16 is applied internally of the IC circuit to an AND gate 3–18 also connected to the 1 indicating output terminal of FF3–10. The output of A3–18 is the Gated Data line on which appears a pulse at T0 time only if FF3–10 has been set to its 1 state by a 1 pulse from the associated bit position of the Data Sensor. The T0 pulse line from Sequencer 3–16 is also directly employed as the Data Gate output from the IC circuit.

The T1 pulse from Sequencer 3–16 is applied to each of two internal AND gates 3–20 and 3–22. The other input of AND gate 3–20 is supplied from the 1 output of a trigger (T) or complementing flip-flop 3–24, whose 0 indicating output in turn goes to AND gate 3–22. Thus, upon occurrence of the T1 pulse, a pulse appears from either A3–20 or A3–22 in accordance with the state of T3–24. The state of this last mentioned element is always changed from one condition to the other condition by the T2 pulse from Sequencer 3–16 applied to its count input. Consequently, it is seen that the final T2 pulse of any operating cycle changes the state of T3–24 so that the T1 pulse of the next following operating cycle is gated through the other one of AND gates 3–20 and 3–22. To insure that trigger 3–24 is in a predetermined state at the beginning of the deskew circuit operation, the leading edge of the Data Enable signal is applied to an input terminal of trigger 3–24 used to initially set it to its 1 indicating state so as to permit AND gate 3–20 to pass the T1 pulse of the first operating cycle in the deskew process. The output of AND gate 3–20 is the Odd Delay Data control lead from the IC circuit while the output from A3–22 is the Even Delay Data control. Furthermore, pulse T2 of the Sequencer 3–16 is taken directly from the IC circuit on its Alternate Pulse Control lead.

Figure 4:
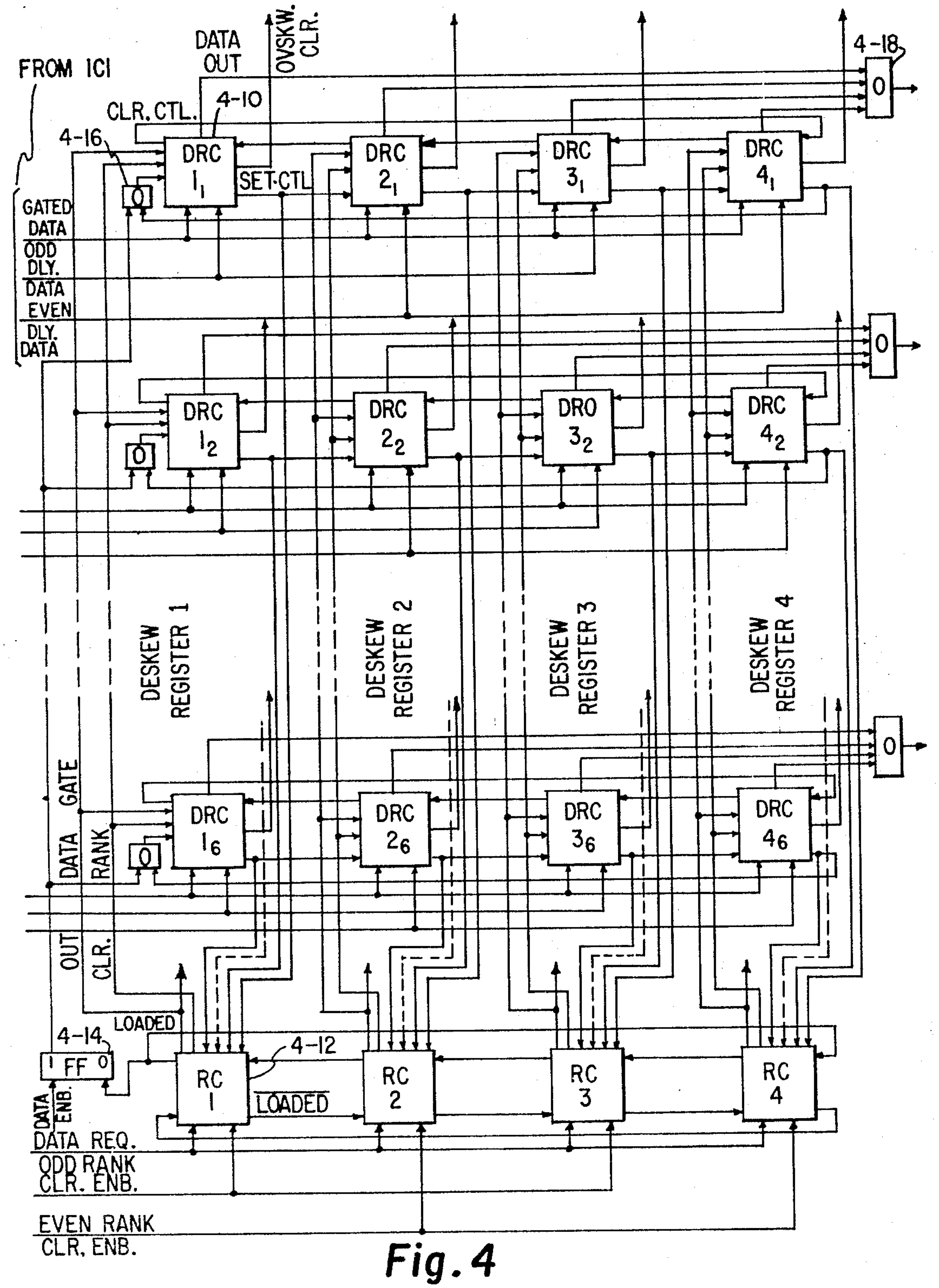

FIG. 4 illustrates the arrangement of basic subdivisions in the Deskewing Register unit 1–16 and the Skew Register Rank Control unit 1–24 of FIG. 1. For the purposes of the present invention it is here assumed that the system has the capacity for simultaneously holding four characters, whose bits are skewed with respect to one another. Consequently, in FIG. 4 there are four deskew registers labelled 1, 2, 3, and 4, with each register being comprised of six stages or cells (because of the six bit character also assumed). These deskew register cells are each shown as an individual block 4–10 whose specific details will be described in connection with FIG. 5. The cells belonging to deskew register 1 are labelled in FIG. 4 as DRC$1_1$, DRC$1_2$, DRC$1_3$, etc. to DRC$1_6$, although DRC$1_3$ through DRC$1_5$ have been omitted for the sake of drawing simplicity. Similarly, the six cells belonging to deskew register 2 are identified as DRC$2_1$, DRC$2_2$, etc. The subscript for each cell indicates the character bit position with which it is identified.

The Skew Register Rank Control unit 1–24 in FIG. 1 is divided up into as many sub-units in FIG. 4 as there are deskewing registers, with these sub-units being labelled RC1, RC2, RC3, and RC4. There is also a flip-flop 4–14 which initially conditions the deskewing registers to accept the first data character transmitted to the system. Details of each RC unit are shown in FIG. 6 subsequently to be described.

Figure 5:
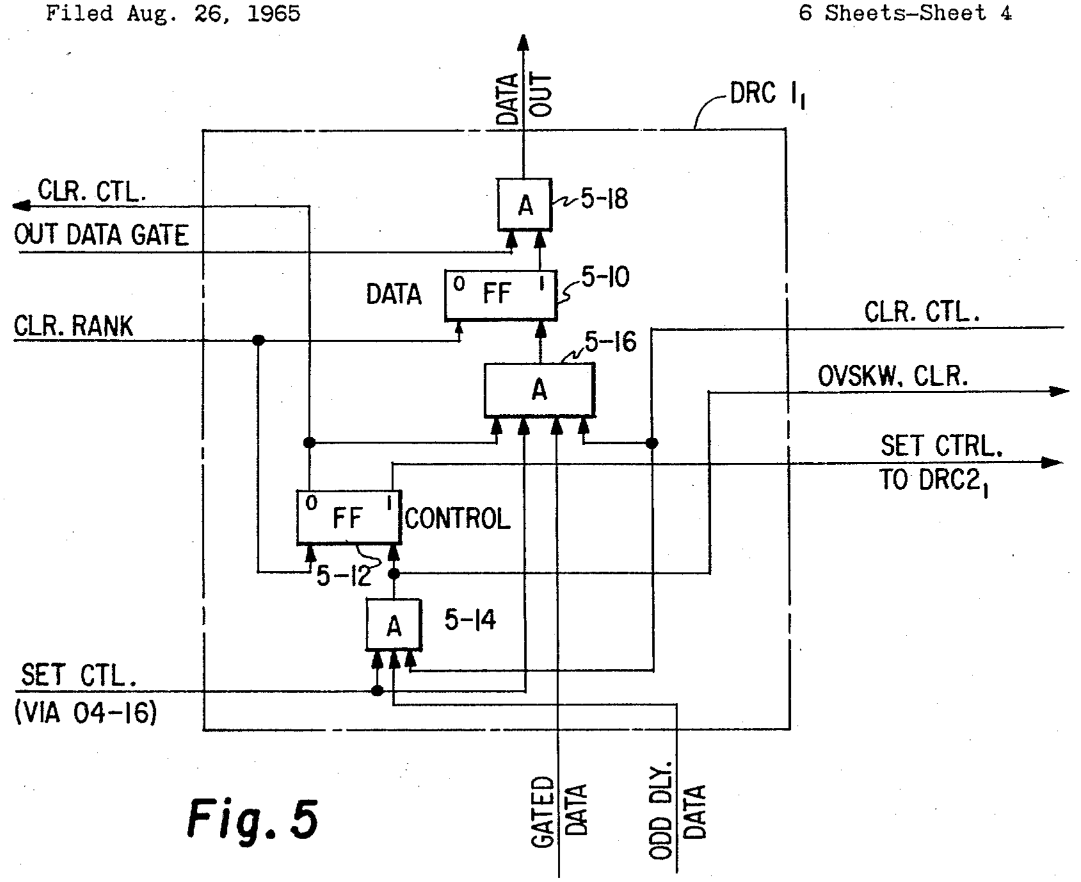
Figure 6:
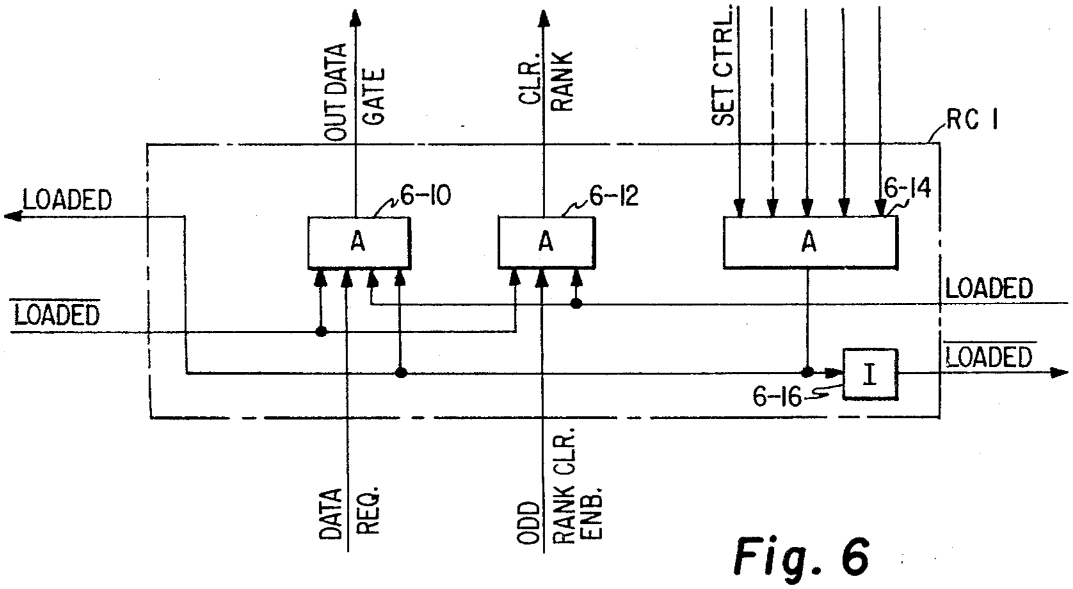

Before proceeding, however, to the description of FIGS. 5 and 6 the interconnection of the sub-units in FIG. 4 will first be briefly described. Corresponding bit position cells of the four deskew registers are arranged in the same horizontal row, with each said deskew register cell having an input from the Gated Data line of the IC circuit (FIG. 2) also in the corresponding bit position. Thus, a 1 information bit in any particular bit position is simultaneously applied to the corresponding position DRC cells in all four deskew registers with, however, only one of these said cells being conditioned to actually accept and store said bit. The Odd Delay Data line and Even Delay Data line from the IC circuit at a bit position are also applied to the corresponding position cells of the respective odd numbered and even numbered deskew registers; hence the Odd Delay Data line from IC1 is connected to DRC$1_1$ and DRC$3_1$ in deskew registers 1 and 3, while the IC1 Even Delay Data line is connected to DRC$2_1$ and DRC$4_1$ of deskew registers 2 and 4.

Each deskew register cell in a particular bit position both generates and receives control signals from cells of the other deskew registers at the same bit position. The control signal labelled Set Control from each DRC in a row is applied as an input to the DRC in the same row of the next higher numbered deskew register, whereas a control signal labelled Clear Control from each DRC is applied as an input to the DRC of the next lower numbered deskew register. For example, FIG. 4 shows that the Set Control output signal in turn is applied as an input to DRC$3_1$. The Set Control output of DRC$3_1$ supplies an input to DRC$4_1$ whose Set Control output in turn is applied back as an input of DRC$1_1$ via an OR gate 4–16$_1$. On the other hand, the Clear Control output of DRC$4_1$ supplies an input to DRC$3_1$, with the Clear Control output of DRC$3_1$ being applied as an input to DR$2_1$. Continuing, the Clear Control output of DRC$2_1$ is appled as an input to DRC$4_1$, the latter acting as the next lower numbered deskew register cell for DRC$1_1$.

Each DRC further has an output lead Data Out for transferrence of its stored character bit to the utilization circuits at the proper time. The Data Out leads of all four DR cells at the same bit position are applied to the same OR gate 4–18, there thus being six such OR gates 4–18$_1$ through 4–18$_6$ one for each bit position of the deskew system. Furthermore, each DRC further generates a control signal on an output lead labelled Overskew Clear which is taken to the overskew detection unit 1–32 of FIG. 1.

Turning now to the vertical or column connections between the units of FIG. 4, it is first seen that each rank control unit 4–12 generates control signals on output lines labelled Out Data Gate and Clear Rank, which are both connected to all of the DR cells in the same deskew register with which the rank control unit is associated. Thus, RC1 has its Out Data Gate and Clear Rank lines connected as inputs to all of the deskew register cells 1$_1$ through 1$_6$ of the deskew register 1. Likewise, RC2 has these two control signal leads connected to all cells of deskew register 2. Each RC unit in turn receives all of the Set Control signals from the DR cells in its associated deskew register.

Another vertical connection in FIG. 4 is that from flip-flop 4–14 whose 1 output is connected to each OR gate 4–16 previously described. Flip-flop 4–14 is initially set to its 1 state by the leading edge of the Data Enable signal coming from the utilization circuit. Once FF4–14 has been so set, it remains in its 1 state until cleared to its 0 state by an output control signal from RC1, subsequently to be described. Flip-flop 4–14 when set to 1 thus appears to each DRC in deskew register 1 as an active Set Control signal from each DRC4, but FF4–14 is only used in order to correctly place the first received data character into the first deskew register during the beginning part of the deskewing operation.

The final set of connections in FIG. 4 to be described are those between the RC units themselves, and those applied to the RC units from the utilization circuits. Each RC unit 4–12 in FIG. 4 generates a control signal on an output lead labelled $\overline{\text{Loaded}}$, and a control signal labelled Loaded. The $\overline{\text{Loaded}}$ from each RC unit is applied as an input to the next higher numbered RC unit, whereas the Loaded signal from each RC unit is applied as an input to the next lower numbered RC unit. Thus, $\overline{\text{Loaded}}$ from RC1 is applied as an input to RC2 whose $\overline{\text{Loaded}}$ signal in turn is applied as an input to RC3, etc. The Loaded signal from RC4 is applied as an input to RC3, etc. FF4–14 is cleared to 0 by the signal appearing to RC2 and RC4).

Three signals are derived from the utilization circuits which are applied in the four RC units. These signals arrive on lines labelled Data Request (applied to each RC unit), Odd Rank Clear Enable (applied only to RC1 and RC3), and Even Rank Clear Enable (Applied only to RC2 and RC4.

Each deskew register cell DRC of FIG. 4 is constructed as shown in FIG. 5, represented as DRC$m_n$ (for a *n*th bit position of a *m*th deskew register). It consists of two flip-flops 5–10, 5–12 and three AND gates 5–14, 5–16, and 5–18. The so-called Data flip-flop 5–10 stores a character bit during the deskewing operation, whereas the Control flip-flop 5–12 indicates that said cell is storing a said bit. The state of Control flip-flop 5–12, when considered with Control flip-flops in other deskew register cells, determines the order of loading and unloading each deskew register.

In FIG. 5, it may be seen that the Gated Data line, on which appears a pulse indicative of a 1 bit, is connected to A5–16 through which it can pass to set FF5–10 to its 1 indicating position. If the character bit instead is a 0 value, then no signal appears on the Gated Data input line, thus leaving FF5–10 in its cleared or 0 position indicative of a 0 character bit. And gate 5–16 is enabled to pass the 1 Gated Data bit by high inputs applied to its other three input terminals. These come from the Clear Control input lead from the next higher numbered DR cell of the same bit position from the Set Control input lead coming from the next lower numbered DR cell at the same bit position, and from the 0 output terminal of its own Control FF5–12. Control FF5–12 in a 0 state indicates the fact that FF5–10 in the DR cell is empty of any significant character bit whether of 0 or 1 value. This 0 output terminal of FF5–12 also is taken from the DR cell to become its Clear Control lead applied to the next lower numbered DR cell. Thus, a high output on the Clear Control lead from any DR cell indicates that said cell is empty, i.e., that its FF5–10 does not contain a character bit. On the other hand, as soon as a 1 or 0 bit has been entered into FF5–10, FF5–12 is set to its 1 state by operation of A5–14 thus indicating that the particular DRC now stores a character bit. AND gate 5–14 also is responsive to high signals simultaneously appearing on the Set Control and Clear Control inputs thereto, as well as to a pulse appearing on the Odd Delay Data line (if the DRC is in an odd numbered deskew register) or on the Even Delay Data line if the DRC under consideration is an even numbered deskew register. From FIG. 3 it will be observed that each time that AND gate 3–18 is pulsed by a T0 signal to thereby transfer the content of FF3–10 to the Gated Data line, there next follows at T1 time a pulse on either the Odd Delay Data line or Even Delay Data line for that bit position indicating that a data transfer has just been made. Consequently, in FIG. 5 the A gate 5–14 may operate at T1 time to set FF5–12 to 1 if a data bit has so been entered via A5–16 into its FF5–10. The output from A5–14 also is taken as the Overskew Clear lead. The third AND gate 5–18 is connected to the 1 output of FF5–10 so as to gate out the bit there contained to the utilization circuits upon occurrence of the Out Data Gate signal from the associated rank control unit 4–12 in FIG. 4.

FIG. 6 shows details of each rank control unit 4–12 of FIG. 4, here represented as RC*m*. It comprises three AND gates 6–10, 6–12, and 6–14, together with one inverter gate 6–16. The purpose of a rank control unit is to determine when all of the deskew cells in the same deskew register have been loaded with character bits so as to then effect transfer therefrom to the utilization circuits. Thus, AND gate 6–14 has connected thereto the Set Control output leads of all deskew cells of its associated deskew register, such that a high output appears from A6–14 when the entire deskew register is filled with all bits of the same character. The output of A6–14 is connected as the Loaded output control lead from the RC unit so that a high output thereon indicates that the deskew register is filled. However, a low output from AND 6–14, thus indicating that one or more of the DRC cells of the same deskew register are empty, is inverted via I6–16 to appear as a high signal on the output lead labelled $\overline{\text{Loaded}}$.

AND gate 6–10 in FIG. 6 has its output connected as the Out Data Gate lead which in turn is connected to each deskew cell of the associated deskew register. A high output from A6–10 specifies that the utilization circuit is ready to receive the deskewed data character, and further, that the load-unload pattern in the deskew registers is satisfied. This load-unload pattern requires that the next higher numbered deskew register must be also loaded with a complete data character before the filled deskew register of interest can be unloaded of its own character, and further, that the next lower numbered deskew register be unfilled or only partially filled. Consequently, AND gate 6–10 has one input thereto from the Loaded output lead of the next higher numbered Rank Control unit, and another input from the $\overline{\text{Loaded}}$ output lead of the next lower numbered Rank Control unit. With high signals on both of these two control leads, coupled with a high signal from AND 6–14 showing that its own deskew register is filled, AND 6–10 is ready to generate a pulse on the Out Data Gate in response to a pulse on the Data Request line from the utilization circuits. Following a Data Request pulse, a pulse next appears on the input line labelled Odd Rank Clear Enable (connected to a Rank Control unit for an odd numbered deskew register) or on the Even Rank Clear Enable input lead (connected to the Rank Control Unit for an even numbered deskew register). This pulse permits AND gate 6–12 to generate a pulse on the Clear Rank output lead which acts to reset the Control flip-flop 5–12 and Data FF5–10 in each deskew register cell of the associated deskew register.

Figures 7, 8:
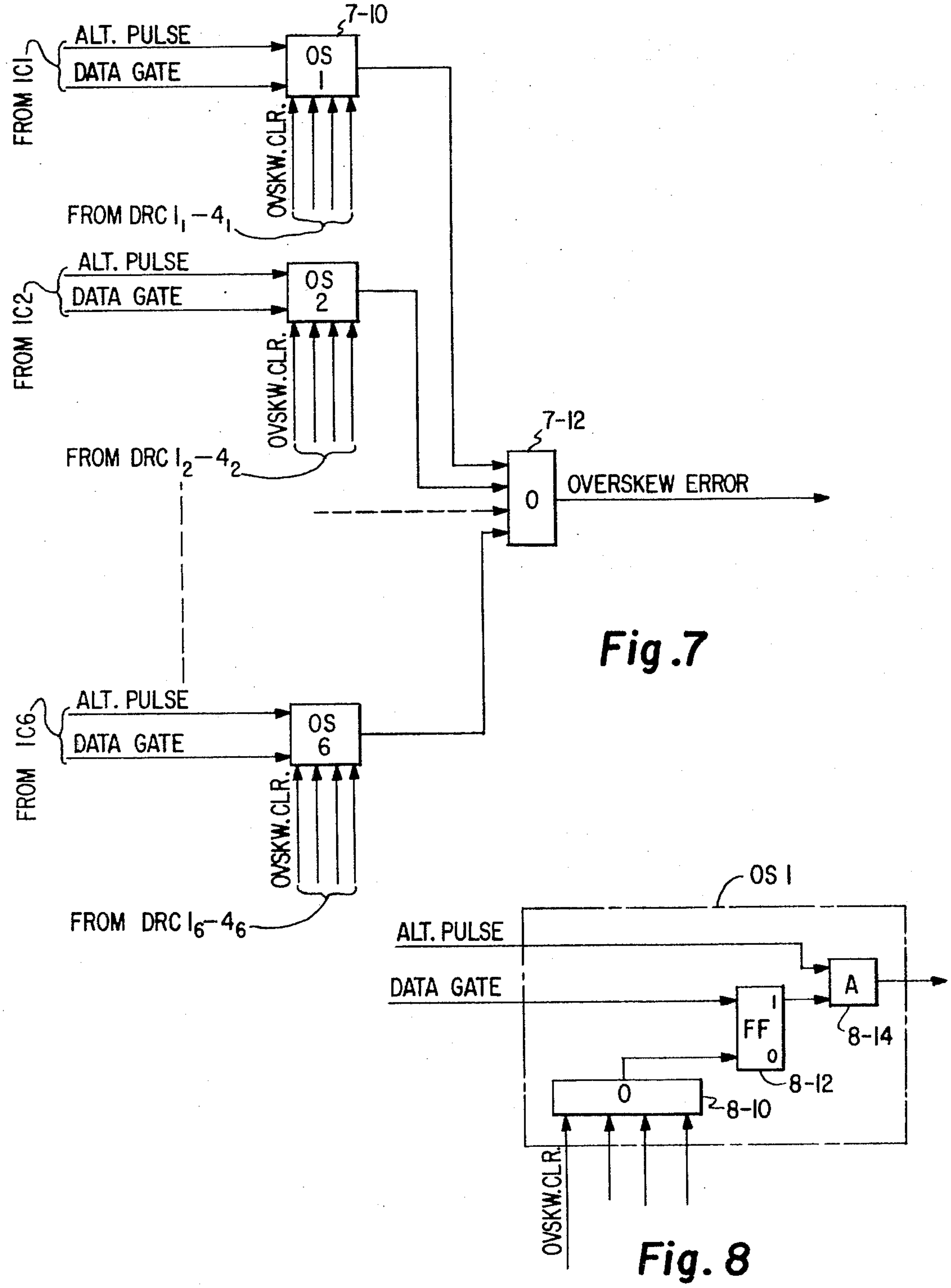

FIG. 7 of the drawings shows the overskew detecting unit as an arrangement of overskew sub-units 7–10, one for each bit position, and labelled as OS1, OS2, etc. to OS6. Details of each OS unit are shown in FIG. 8 next to be described. Each OS unit 7–10 is connected to the Alternate Pulse output lead and the Data Gate output lead from the IC unit in its associated bit position. Furthermore, each OS unit 7–10 is further connected to each Overflow Clear output lead coming from the four DRC units at the same corresponding bit position. OS1, for example, has input thereto from $DRC1_1$, $DRC2_1$, $DRC3_1$, $DRC4_1$, each identified with bit position 1. An output is obtained from each overskew unit in FIG. 7 which is applied to a single OR gate 7–12 whose output in turn is applied to the utilization circuits and is labelled Overskew Error. Consequently, an output from any one of the overskew units 7–10 is indicative of an overskew error so as to transmit a signal indicating same to the utilization circuits.

In FIG. 8, which shows details of each overskew unit 7–10, there are OR gate 8–10, flip-flop 8–12, and an AND gate 8–14. OR gate 8–10 receives signals on the four Overflow Clear leads, with its output in turn being connected to set FF8–12 to its 0 indicating state. A pulse on the Data Gate input sets FF8–12 to its 1 state, with the 1 output terminal thereof being connected to AND gate 8–14. The other input of AND 8–14 receives the pulse on the Alternate Pulse line. The explanation of the overskew detect operation will be postponed until after a description of the detailed operation of the remainder of the system.

Figure 9:
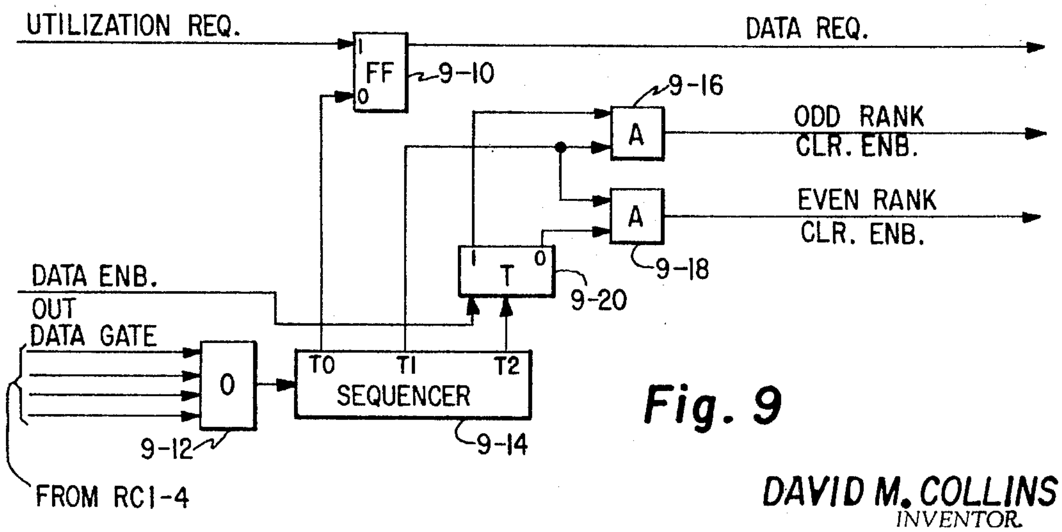
FIGS. 3–9 show one particular embodiment of the invention, where.

FIG. 9 shows circuits for generating signals on the Data Request, Odd Rank Clear Enable and Even Rank Clear Enable leads which in turn are connected to the Rank Control units in FIG. 4. A flip-flop 9–10 is set to its 1 state by operation of the utilization circuits whenever the latter can accept a data character from the deskew system. Thus, the signal stays high on the Data Request output line from FF9–10 until said flip-flop is later cleared to 0. This last operation occurs when the Rank Control unit of the selected deskew register generates its Out Data Gate Control signal which is then supplied via OR gate 9–12 to the input of a Sequencer 9–14. Sequencer 9–14 may be a tapped delay line, as is Sequencer 3–16 in FIG. 3, so as to generate three spaced and non-overlapping pulses T0, T1, and T2 in that sequence. The first T0 pulse clears FF9–10 to 0, thus terminating a Data Request signal. The next following T1 pulse is applied to AND gates 9–16 and 9–18 so as to generate a pulse on either the Odd Rank Clear Enable or Even Rank Clear Enable output leads according to the state of a trigger flip-flop or counter 9–20. The state of T9–20 is changed by the last following T2 pulse so as to cause successive T1 pulses to alternately appear at the outputs of AND gates 9–16 and 9–18. The leading edge of the Data Enable signal sets T9–20 to its 1 state, thus specifying that the Odd Rank Clear Enable output lead is the first to receive the T1 pulse at the beginning of a deskew operation.

The operation of the present invention as exemplified by the embodiments shown in FIGS. 3–9 can best be understood by the discussion of a specific example. Therefore, assume that seven characters are serially transmitted from the Data Sensor of FIG. 2 to the Input Control units at the read timing indicated by Table 1 below.

TABLE 1

| BP Ch. | Read Time 1 | 2 | 3 | 4 | 5 | 6 | 7 | 8 | 9 | 10 | 11 | 12 | 13 |
|---|---|---|---|---|---|---|---|---|---|---|---|---|---|
| 1 | | $b_1$ | | $b_2$ | $b_3$ | | $b_4$ | $b_5$ | $b_6$ | | | $b_7$ | |
| 2 | $b_1$ | $b_2$ | $b_3$ | | | $b_4$ | | $b_5$ | | $b_6$ | | $b_7$ | |
| 3 | | | $b_1$ | | $b_2$ | | $b_3$ | | $b_4$ | $b_5$ | | $b_6$ | $b_7$ |
| 4 | | | $b_1$ | | $b_2$ | | $b_3$ | | $b_4$ | $b_5$ | | $b_6$ | $b_7$ |
| 5 | | | $b_1$ | | $b_2$ | | $b_3$ | | $b_4$ | $b_5$ | | $b_6$ | $b_7$ |
| 6 | | $b_1$ | $b_2$ | | | $b_3$ | $b_4$ | | $b_5$ | | $b_6$ | | $b_7$ |

In Table 1 above, the time sequence of bits successively appearing on each of the channels BP1 through BP6 are shown in horizontal rows, with the read time intervals being numbered from 1 through 13. Each bit is identified by letter *b* followed by a number indicating the character to which it belongs, i.e., 1, 2, 3, etc. to 7. The value of the particular bit is immaterial and may be either 1 or 0. Furthermore, each of the read times 1 through 13, while being shown equally spaced, need not be uniform nor need they be the same for all channels.

The skewed pattern of incoming character bits is evident from the examination of Table 1 which may be interpreted as follows. At read time 1, only the BP2 bit of the first character makes its appearance to IC2 of FIG. 2 from the data sensor. At the next following read time 2, the BP2 bit of the second character arrives at IC2, as does the BP1 bit of character 1 to IC1 and the BP6 bit of character 1 to IC6. At the next following read time 3, the BP2 bit of character 3 appears to IC2, as do the BP3, 4 and 5 bits of the first character, and the BP6 bit of the second character. Thus, it is not until the end of read time 3 that all six bits of the first serially transmitted character have been received by the input control units of FIG. 2, even though one or more bits of characters 2 and 3 have also been received by this time. The six bits of the first character have been placed in deskew register 1 so that by the end of read time 3, said deskew register 1 is completely loaded with said first character. The two received bits of character 2 have been placed in the associated bit position cells $DRC2_2$ and $DRC2_6$ of deskew register 2, while the single received BP2 bit of character 3 has been placed into cell $DRC3_2$ of deskew register 3. Table 2 below shows in tabular form when each deskew register is completely loaded with a character.

TABLE 2

| Deskew Registers 1 | 2 | 3 | 4 |
|---|---|---|---|
| L1(3) | L2(5) | L3(7) | L4(9) |
| U1(5) | U2(7) | U3(9) | U4(10) |
| L5(10) | L6(12) | L7(13) | |
| U5(12) | U6(13) | | |

In interpreting Table 2 by what has so far been described of Table 1, it is seen that deskew register 1 is loaded with character 1 at read time 3, as evidenced by the symbol L1(13) found in the deskew register 1 column, the top line or row thereof. However, before this first character can be unloaded from deskew register 1 and sent to the utilization circuits, it is first necessary to completely load deskew register No. 2 with all bits of the second character. Thus, turning back to Table 1 it is seen at read time 4 that the BP1 bit of the second character is received, but it is not until the end of read time 5 that the BP3, 4, and 5 bits of the second character are finally received. Also received at read time 5 is the BP1 bit of the third character. Table 2 therefore shows by L2(5) that deskew register 2 is loaded with the second character at read time 5. At this read time 5 deskew register 1 may now be unloaded of character 1, with this operation being indicated in Table 2 by the term U1(5) in the deskew register 1 column, the second line thereof.

Before deskew register 2 can be unloaded of its character 2, deskew register 3 must first be completely filled with character 3. From Table 1 this is seen not to occur until the end of read time 7, and is shown in Table 2 as L3(7). Deskew register 2 may now be unloaded of character 2 at read time 7 with said second character being transmitted to the utilization circuits. After deskew register 4 is completely loaded with character 4 by read time 9, deskew register 3 may be unloaded of character 3.

At this point it might be mentioned that bits of the fifth serially transmitted character are placed into deskew register 1 which has been cleared of information since read time 5 when it was unloaded of character 1. The first bit of character 5 does not arrive until read time 8, on BP channels 1 and 2 thereof, so that there is no overskew situation here present. By the end of read time 10, all six bits of character 5 have been received by deskew register 1 which in turn enables deskew register 4 to be unloaded of character 4. Bits of the sixth serially transmitted character are placed into the skew register 2 as they are received, with Table 1 showing that character 6 is completely received by read time 12. Thus, character 5 is unloaded from deskew register 1 at read time 12. Table 1 concludes with the receipt of character 7 by the end of read time 13 to be stored in deskew register 3, and permitting the unload of character 6 from deskew register 2.

Next follows a detailed description of circuit operation to effect the above described deskew example. Before receipt of any bit of the first character, the Data Enable signal is applied from the utilization circuits, the leading edge of which sets trigger T3–24 to its 1 condition, FF4–14 to its 1 condition, and trigger T9–20 to its 1 condition. When the BP2 bit of the first character is received at read time 1, the pulse on the 0 or 1 leads of the Data Sensor, as the case may be, sets FF3–10 in IC2 either to 1 or 0 and at the same time initiates operation of its Sequencer 3–16. The first T0 pulse from Sequencer 3–16 opens AND gate 3–18 to pass this BP2 bit of the first character to each of the units $DRC1_2$, $DRC2_2$, $DRC3_2$, and $DRC4_2$ via the Gated Data line. However, only $DRC1_2$ can accept this bit. It will be remembered that the Control flip-flop 5–12 in each of these four deskew registers cells is in its 0 state so that the Clear Control output lines therefrom are high and the Set Control outputs therefrom are low. Consequently, AND gates 5–16 in $DRC2_2$, $DRC3_2$, and $DRC4_2$ are not enabled to pass any bit appearing on the Gated Data line from IC2. Although the Set Control lead from $DRC4_2$ is low, which would normally also prevent $DRC1_2$ from accepting said Gated Data bit, the 1 condition of FF4–14 in effect makes high the Set Control input to $DRC1_2$ so as to permit AND gate 5–16 therein to enter the BP2 bit of the first character into its FF5–10.

The T1 pulse from Sequencer 3–16 in IC2 now is applied to and passes through AND gate 3–20 of IC2 so as to generate a pulse on the Odd Delay Data line to $DRC1_2$ and $DRC3_2$. Only AND gate 5–14 in $DRC1_2$ is responsive to this pulse to thus set FF5–12 therein to its 1 condition, thereby signifying that $DRC1_2$ is filled with a character bit. The following T2 pulse from Sequencer 3–16 in IC2 now changes trigger T3–24 to its 0 state. Thus ends the operation of the deskew system during read time 1.

During read time 2, the received BP1 and BP6 bits of the first character are respectively entered, via IC1 and IC6, into $DRC1_1$ and $DRC1_6$ in the same manner as was entered the BP2 bit of said first character into $DRC1_2$, because FF4–14 still remains in its 1 condition. The BP2 bit of the second character is also received by the system during read time 2. Thus, FF3–10 in IC2 is set to the value of this bit, and Sequencer 3–16 therein is initiated once again to generate T0, T1, T2 pulses in that order. The T0 pulse gates this BP2 second character bit from FF3–10 to the Gated Data line where it is applied to all of the units $DRC1_2$, $DRC2_2$, $DRC3_2$, and $DRC4_2$. However, only $DRC2_2$ can receive this bit. This is because AND gate 5–16 in $DRC2_2$ receives a high signal on the Clear Control lead from $DRC3_2$, a high signal on the Set Control lead from $DRC1_2$, and its Control flip-flop 5–12 is in the 0 condition. $DRC1_2$ cannot receive this BP2 bit of the second character because its flip-flop 5–12 is no longer in the 0 condition so as to prevent a high signal to one input of its own AND gate 5–16. The T1 pulse from Sequencer 3–16 in IC2 is now gated through AND gate 3–22 on to the Even Delay Data line and thus is applied to $DRC2_2$ and $DRC4_2$. Only AND gate 5–14 in $DRC2_2$ can respond to this pulse, so as to set its Control flip-flop 5–12 thus indicating $DRC2_2$ to be filled with a character bit.

During read time 3, the BP3, 4, and 5 bits of the first character are entered into $DRC1_3$, $DRC1_4$, and $DRC1_5$, respectively, in the manner indicated above. The BP6 bit of the second character is entered into $DRC2_6$ in the same fashion as was entered the BP2 bit of said second character into $DRC2_2$. Also received during read time 3 is the BP2 bit of character 3, applied by the data sensor to IC2. This particular bit enters FF3–10 in IC2 and initiates operation of its Sequencer 3–16. The T0 pulse therefrom gates the BP2 bit onto the Gated Data line, but said bit can only enter $DRC3_2$ because of the 0 condition of FF5–12, the high signal on the Clear Control input from $DRC4_2$, and the high signal on the Set Control input from $DRC3_2$. Since Trigger 3–24 in IC2 is now once again in its 1 state (having been placed there during entry of the bit into $DRC2_2$), the T1 pulse passes through AND 3–20 from which it is applied to $DRC1_2$ and $DRC3_2$. AND gate 5–14 in $DRC3_2$ responds to the pulse on the Odd Delay Data line to set its flip-flop 5–12, thus indicating storage of a character bit therein. In $DRC1_2$ this Odd Delay Data pulse is also applied to AND gate 5–14 therein, but does not produce an output therefrom because at this time the signal on Clear Control from $DRC3_2$ is low. The T2 pulse from Sequencer 3–16 in IC2 once again returns Trigger 3–24 to its 0 condition.

By the end of read time 3, it is thus seen that each of the cells in deskew register will have its Control flip-flop 5–12 set to a 1 condition. AND gate 6–14 in RC1 therefore produces a high output indicative of the fact that deskew register 1 is completely loaded with a character. However, character 1 cannot be unloaded from deskew register 1 at read time 3 even though the utilization circuits might now have caused a high Data Request signal from FF9–10. This is because the second character has not been completely placed into deskew register 2, thus keeping low the signal on the output lead Loaded from RC2 which is applied to AND gate 6–10 in RC1. It is not until the end of read time 5 that the final three bits of character 2 are placed into $DRC2_3$, $DRC2_4$, and $DRC2_5$ so as to make high the output of AND 6–14 in RC2. At this time then, AND gate 6–10 in RC1 is fully enabled (if a Data Request signal is present) so as to produce a high output on the Out Data Gate lead therefrom. This high signal is applied to A5–18 in each of the cells in deskew register 1 so as to transmit the data bits from all flip-flops 5–10 in said deskew register 1. Thus, all six bits of the first character appear at the outputs of OR gates 4–18 where they are received by the utilization circuits. The high signal on the Out Data Gate lead from RC1 is further applied, via OR gate 9–12 in FIG. 9, to Sequencer 9–14. The T0 pulse appearing therefrom then clears FF9–10 to its 0 condition, thus terminating the Data Request signal. The next following T1 pulse from Sequencer 9–14 is gated through A9–16, because of the 1 condition of Trigger 9–20, to appear on the Odd Rank Clear Enable lead common to RC1 and RC3. In RC1, A6–12 is now fully enabled by the appearance of this pulse on the Odd Rank Clear Enable lead so as to generate a signal on the Clear Rank output in order to set to 0 the flip-flops 5–10 and 5–12 in all of deskew registers 1. In RC3, AND gate 6–12 is unaffected by this pulse on the Odd Rank Clear Enable lead because there is no high signal on the Loaded output from RC4. The T2 pulse from Sequencer 9–14 now changes Trigger T9–20 to its 0 state so that when character 2 is read from deskew register 2, a pulse will appear on the Even Rank Clear Enable lead to RC2 and RC4 in order to later clear deskew register 2 of said character 2.

It should further be added that the appearance of the high signal on the output lead Loaded from RC1 causes a change of FF4–14 to its 0 state, thus terminating the artificial Set Control signal to the cells in deskew register 1. Thereafter, in order to place any bit of the fifth character (also any bit of the ninth, thirteenth, seventeenth, etc. characters), it will first be necessary for the corresponding bit position DRC in deskew register 4 to have first been loaded with the bit of the immediately proceding character in order to generate the required Set Control signal.

Operation of the overskew detect circuits of FIGS. 7 and 8 will now be described. Each time that a signal is generated on the Data Gate lead from an IC unit, thus specifying receipt of a character bit in that particular BP channel, it sets FF8–12 in the corresponding bit position overskew unit to its 1 condition. Said Data Gate signal is generated at T0 time during operation of Sequencer 3–16. The next following T1 pulse from Sequencer 3–16 of the active IC unit then should normally cause an AND gate 5–14 in one of the DRC units (for said bit position) to generate an output in order to place the presently received channel bit into the correct deskew register. If one of said AND gates 5–14 so generates an output signal, it is applied to the Overskew Clear lead therefrom which is taken to the same OS unit in FIG. 7 in which FF8–12 has just previously been set to 1. The Overskew Clear signal is applied via OR8–10 to reset FF8–12 to its 0 condition, such that upon the next following occurrence of the T2 signal from Sequencer 3–16, the Alternate Pulse fails to find AND gate 8–14 enabled thus failing to generate any Overskew Error signal to the utilization means. On the other hand, if the T1 signal from Sequencer 3–16 fails to pass any AND gate 5–14 this indicates an overskew error inasmuch as FF8–12 still remains in its 1 condition at the time that the next following Alternate Pulse appears to associated AND gate 8–14.

Figure 10:
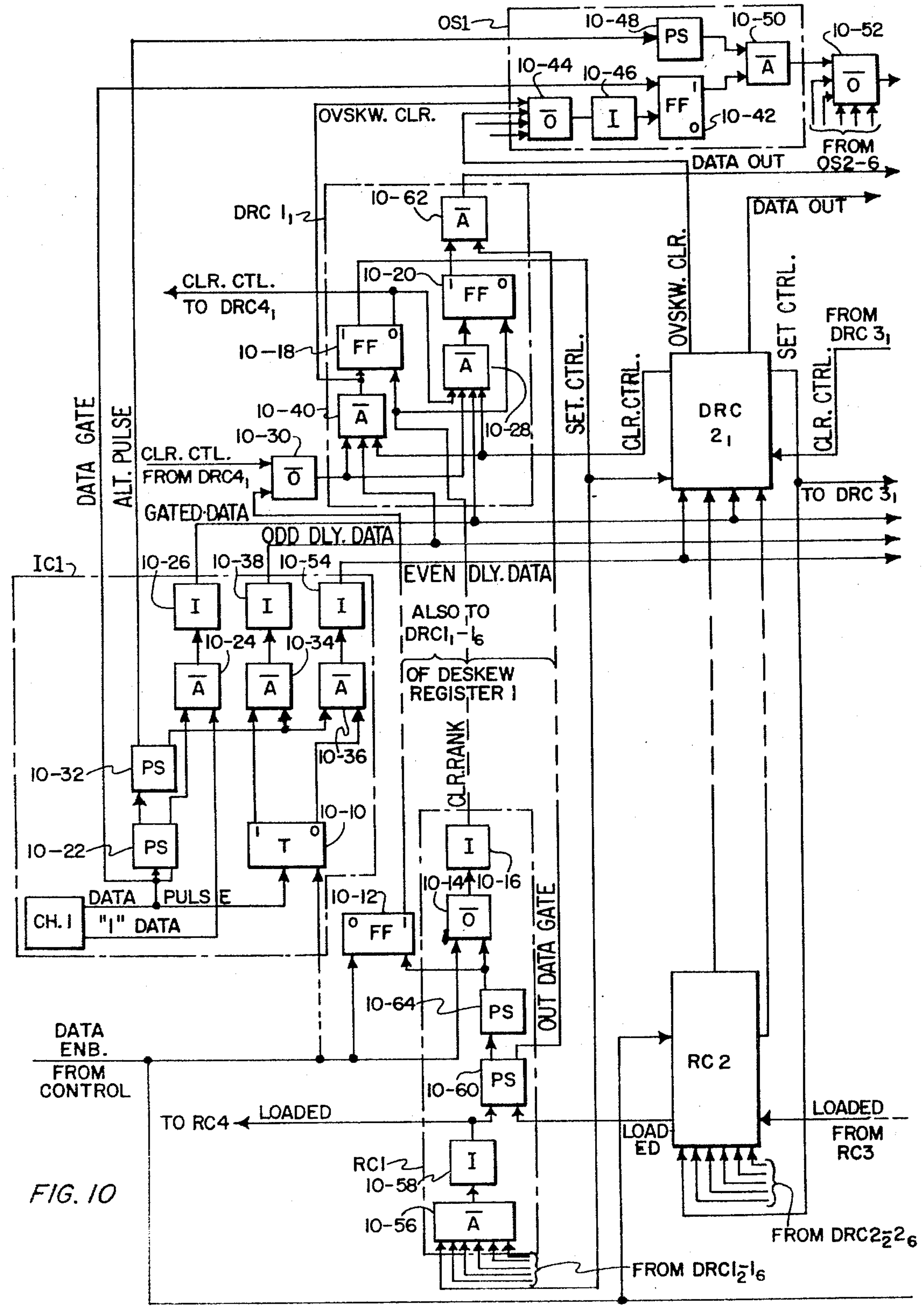
FIG. 10 shows a second embodiment of the invention.

An embodiment of the invention somewhat different from that shown in FIGS. 3–9 is schematically shown in FIG. 10. In this second embodiment, the same circuit known as a NOR gate is utilized for both the AND and OR logical elements which in turn are basically represented by $\overline{A}$ and $\overline{O}$, respectively. An AND function is performed by this gate whenever all inputs thereto are relatively high so that its output then goes low. Conversely, an OR function is performed by the gate for any low input thereto which thus makes its output high. A NOR gate with the single input is merely an inverting element I. Flip-flop components are generally formed by utilizing a pair of the NOR elements with the output of each NOR connected to a first input of the other such that this configuration becomes bistable. Thus, a low input signal to a second input of one of the NOR elements makes high the output of that NOR element which in turn makes high a second input of the other NOR element. If that other NOR element has all remaining control inputs high, then its output goes low which is transmitted back to the first input of the one NOR element so as to maintain its output high even after the disappearance of the initiating low input signal thereto. A trigger circuit T in FIG. 10 is switched from one bistable state to the other upon application of a low signal to its center input, and is reset to a particular stable state by a low input applied to a side input thereto. FIG. 10 also employs pulse shaper circuits PS each of which, when placed into operation, generates temporary positive going and negative going pulses from its right and left output terminals, respectively. Each pulse shaper is so placed into operation by a positive going input signal edge or, where there are two input terminals, by the positive going edge of the second high signal to be applied thereto.

The operation of FIG. 10 will now be described. Prior to entry of any information into the deskew register cells, the Data Enable signal from Control is considered to be relatively low so as to set a Trigger 10–10 in each IC unit to its 0 state and to also set flip-flop 10–12, common to all of the DR cells in deskew register 1, to its 0 state. Furthermore, the Data Enable signal is applied to an $\overline{O}$ gate 10–14 in each RC unit so as to make high its output which in turn makes low the output 10–16, thus setting to 0 flip-flops 10–18 and 20–20 in each DRC of all deskew registers. When information is to be loaded into the deskew registers, the Data Enable signal becomes high and is maintained high during operation of the invention.

After the Data Enable signal is changed from a low to a high value, information may now be entered from the channels into the deskew registers, with deskew register 1 being the first to receive an information bit. Assume, for example, that the first bit to arrive of the first character appears on channel 1 such that a low Data Pulse is generated in IC1. Thus, the leading edge of this pulse is negative going and the trailing edge is positive going. If said information bit is also a binary 1 value, then the line marked "1" Data becomes high but otherwise remains low if the information bit is a binary 0. The trailing edge of the Data Pulse in IC1 is applied to a pulse shaper 10–22 therein in order to make temporarily high its right output and make low its left output. The high output of PS 10–22 is applied to $\overline{A}$ gate 10–24 which also is connected to the "1" data line so as to make low the output of $\overline{A}$10–24 in the event that the information bit being received is a binary 1. The low output of $\overline{A}$10–24 thus makes high the output of an I gate 10–26 which is connected to the Gated Data line and on which therefore appears a high signal if the received information bit is a binary 1. In DRC$1_1$, an $\overline{A}$ gate 10–28 has high inputs applied to three of its control input terminals because of the 0 state of FF10–18, therein, the 0 state of FF10–18 in DRC$2_1$, and the 0 state of FF10–12 which makes low the output of its 1 terminal and thus high the output of an $\overline{O}$ gate 10–30. Consequently, if the received information bit is a binary 1, the now high Gated Data line from I10–26 causes $\overline{A}$10–28 to become low and thus sets Data flip-flop 10–20 in DRC$1_1$ to its 1 state. If instead the received information bit is a binary 0, then the Gated Data line remainsl ow so as to keep high the output of $\overline{A}$10–28 in DRC$1_1$ and thus fail to change FF10–28 in DRC$1_1$ and thus fail to change FF10–20 therein from a 0 to its 1 condition.

The aforementioned Data Pulse in IC1, by virtue of its negative going leading edge, also changes trigger 10–10 from its 0 condition to its 1 condition prior to the time that it energizes PS10–22. When PS10–22 terminates operation, the trailing positive going edge of the pulse from its left output initiates operation of a pulse shaper 10–32 such that high and low pulses respectively appear on its left and right terminals. The high signal from the right terminal of PS10–32 is directed to A gates 10–34 and 10–36 which are respectively connected to the 1 and 0 output terminals of trigger 10–10. Since by this time trigger 10–10 is in its 1 state, only $\overline{A}$10–34 has all inputs thereto high so as to generate a low output which is in turn inverted by I10–38 to generate a positive output on the Odd Delay Data line. This, therefore, causes $\overline{A}$ gate 10–40 in DC$1_1$ to set FF10–18 to its 1 condition thereby indicating that information has been entered into said register cell. The 1 output terminal of FF10–18 goes high and is labelled Set Control, and the 0 output terminal signal of FF10–18, labelled Clear Control, now goes low.

Overskew detection also occurs during entry of information. The aforementioned Data Pulse in IC1 is applied to an output lead labelled Data Gate to set a flip-flop 10–42 in the OS1 circuit to its 1 condition. If $\overline{A}$10–40 in DRC$1_1$ does go low subsequently thereto, thereby signifying the fact that DRC$1_1$ has accepted in the information bit, this low signal makes high the output of an $\overline{O}$ gate 10–44 in OS1 which in turn is inverted via I10–46 so as to reset FF10–42 to its 0 condition. Consequently, termination of the low output signal from the left terminal of PS10–32 in IC1, when it is applied to PS10–48 so as to initiate operation of same, fails to find $\overline{A}$ gate 10–50 in an enabled condition. This means that the $\overline{A}$ gate 10–50 output remains high thereby signifying no overskew error. However, if FF10–42 remains in its 1 condition where placed by a Data Pulse, when pulse shaper 10–48 is finally operated $\overline{A}$ gate 10–50 has its output made low, thus indicating overskew error.

The next following information bit applied to channel 1 will be placed into DRC$2_1$ in a similar manner. The Data Pulse associated therewith now triggers T10–10 in IC1 back to its 0 state so that a pulse will appear on the Even Delay Data line via $\overline{A}$10–36 and I10–54. The operation of DRC$2_1$ is believed to be obvious from the previously described operation of DRC$1_1$.

After deskew register 1 has been completely filled with bits of the first character, all flip-flops 10–18 in these register cells will be in a 1 condition thus making high all six inputs to an $\overline{A}$ gate 10–56 in RC1. As soon as this occurs, the output of $\overline{A}$10–56 goes low and is inverted via I10–58 to make high one input control terminal of a pulse shaper 10–60. The high output of I10–58 is also labelled as Loaded Output. However, pulse shaper 10–60 is not initiated into operation until it receives a second high input via the Loaded Output line of RC2 from the equivalent gate I10–58 therein at the time that deskew register 2 is completely filled with the second received character. As soon as the second deskew register is so completely filled, PS10–60 in RC1 is energized into operation thus generating high and low pulse signals on its right and left output terminals, respectively. The high output signal on its right terminal is applied to an $\overline{A}$ gate 10–62 in each register cell of the first deskew register in order to simultaneously transmit out of the stored bits of the first character from the storage flip-flops 10–20 therein. The subsequent termination of the low output from the left terminal of PS10–60 in RC1 further energizes a second pulse shaper 10–64 which thereupon makes low its left output terminal so as to set FF10–12 to a 1 condition. This permits the state of deskew register 4 to thereafter control entry of information into deskew register 1, since when deskew register 4 is filled with a bit of information, its Clear Control lead will be low thus making high the output of an $\overline{O}$10–30 gate associated with each of the register cells in the first deskew register. The low output from PS10–64 in RC1 further makes high the output of $\overline{O}$10–14 which, when inverted via I10–16, clears flip-flops 10–18 and 10–20 in each first deskew register cell.

While various preferred embodiments of the invention have been shown and described, modifications thereto and variations thereof may occur to those skilled in the art without departure from the novel principles defined in the appended claims.

The embodiments of the invention in which an exclusive property or privilege is claimed are defined as follows:

1. A circuit for receiving sequentially applied signal sets each comprising related parallel information bit signals, where each information bit signal of the same signal set appears on a different one of a group of information channels, which circuit comprises in combination:

(a) an in-control circuit means, said in-control circuit means comprising, a first pair of leads for each information channel, and first means individually connected to each said first lead pair for generating control signals thereon in response to information bit signals appearing on the information channel;

(b) deskew register means comprising, an even number N of at least four bistable first control means for each information channel, a like number N of multi-control input second means for each information channel, each said $n$th second means for the same information channel acting, when all of its control inputs are conditioned, to set the correspondingly numbered $n$th first control means for the same information channel to a first stable state, where each alternately numbered 1 to N−1 second means for the same information channel has a first control input responsive to each control signal generated on one lead of said channel first lead pair, and each alternately numbered 2 to N second means has a first control input responsive to each control signal generated on the other lead of said channel first lead pair, a like number N of bistable data storage means for each information channel;

a like number N of multi-control input third means for each information channel, each said $n$th third means for the same information channel being connected and capable of acting, when all of its control inputs are conditioned, to set the correspondingly numbered $n$th storage means for the information channel to a stable state representing an information bit value on the information channel, where each said $n$th third means for the same information channel has a first control input conditioned by a second stable state of the correspondingly numbered $n$th first control means for the information channel, and each said $n$th third means and the correspondingly numbered $n$th second means for the same information channel has a second control input conditioned by the first stable state of the $n-1$th first control means for the information channel and a third control input conditioned by the second stable state of the $n+1$th first control means for the information channel;

(c) rank control means comprising, a like number N of multi-control input fourth means common to all of the information channels, each said fourth means having either a first state or a second state according respectively to whether all or less than all of its control inputs are conditioned, where each said $n$th fourth means has control inputs thereof respectively conditioned by the first stable state of each correspondingly number $n$th first control means in all of the information channels; and fifth means common to all of the information channels and responsive to the first states of any $n$th and $n+1$th fourth means for sensing the state of each correspondingly numbered $n$th storage means in all of the information channels.

2. A circuit according to claim 1 wherein each said first means includes a binary counting stage.

3. A circuit according to claim 1 and including tenth means common to all of the information channels and acting to set each $n$th first control means in all of the information channels to a second stable state after said fifth means senses each correspondingly number $n$th storage means.

4. A circuit according to claim 1 wherein is further included, a first control lead for each information channel, sixth means individually connected thereto for generating a control signal thereon in response to each information bit signal appearing on the information channel, a second control lead for each information channel and seventh means individually connected thereto for generating a control signal thereon in response to each information bit signal appearing on the information channel, where the control signal on said second control lead is delayed in time with respect to the control signal on said first control lead, a bistable second control means for each information channel, each said second control means being set to a first stable state by a control signal on the channel first control lead, a multi-control input eighth means for each information channel acting, when any one of its control inputs is conditioned, to set the said second control means for the information channel to a second stable state, where each said eighth means has control inputs thereof respectively conditioned by operation of each said second control means for the information channel, and a multi-control input ninth means for each information channel acting to generate an error signal when all of its control inputs are conditioned, where each said ninth means has a first control input conditioned by the first stable state of said second control means for the information channel, and a second control input conditioned by a control signal appearing on the channel second control lead.

5. A circuit according to claim 4 wherein is further included tenth means common to all of the information channels and acting to set each $n$th first control means in all of the information channel to a second stable state after sensing by said fifth means of each correspondingly number $n$th storage means.

6. A circuit for receiving sequentially applied signal sets each comprising related parallel information bit signals, where each information bit signal of the same signal set appears on a different one of a group of information channels, which circuit comprises in combination:

(a) an in-conrtol circuit means, said in-control circuit means comprising, a first pair of leads for each information channel, and first means individually connected to each said first lead pair for generating control signals thereon in response to information bit signals appearing on the information channel;

(b) deskew register means comprising, an even number N of at least four bistable first control means for each information channel, a like number N of multi-control input second means for each information channel, each said $n$th second means for the same information channel acting, when all of its control inputs are conditioned, to set the correspondingly numbered $n$th first control means for the same information channel to a first stable state, where each alternately numbered 1 to N−1 second means for the same information channel has a first control input responsive to each control signal generated on one lead of said channel first lead pair, and each alternately numbered 2 to N second means has a first control input responsive to each control signal generated on the other lead of said channel first lead pair, a like number N of bistable storage means for each information channel;

a like number N of multi-control input third means for each information channel, each said $n$th third means for the same information channel being connected and capable of acting, when all of its control inputs are conditioned, to set the correspondingly numbered *n*th storage means for the information channel to a stable state representing an information bit value on the information channel, where each said *n*th third means for the same information channel has a first control input conditioned by a second stable state of the correspondingly numbered *n*th first control means for the information channel, and each said *n*th third means and the correspondingly numbered *n*th second means for the same information channel has a second control input conditioned by the first stable state of the $n-1$th first control means for the information channel and a third control input conditioned by the second stable state of the $n+1$th first control means for the information channel;

(c) rank control means comprising, a like number N of multi-control input fourth means common to all of the information channels, each said fourth means having either a first state or a second state according respectively to whether all or less than all of its control inputs are conditioned, where each said *n*th fourth means has control inputs thereof respectively conditioned by the first stable state of each correspondingly numbered *n*th first control means in all of the information channels; and a like number N of multi-control input fifth means common to all of the information channels, each said *n*th fifth means acting, when all of its control inputs are conditioned, to sense the state of each correspondingly numbered *n*th storage means in all of the information channels, where each said *n*th fifth means has at least a first control input conditioned by the first state of the correspondingly numbered *n*th fourth means and a second control input conditioned by the first state of the $n+1$th fourth means.

7. A circuit according to claim 6 wherein each said first means includes a binary counting stage.

8. A circuit according to claim 6 and including a like number N of multi-control input tenth means common to all of the information channels, each said *n*th tenth means acting to set each correspondingly numbered *n*th first control means to its second stable state subsequent to operation of the correspondingly numbered *n*th fifth means.

9. A circuit according to claim 8 wherein each said *n*th tenth means upon acting further clears each correspondingly numbered *n*th storage means.

10. A circuit according to claim 6 wherein is further included, a second pair of leads, eleventh means connected thereto for generating control signals thereon in response to operation of said fifth means, and a like number N of multi-control input tenth means common to all of the information channels, each said *n*th tenth means acting, when all of its control inputs are conditioned, to set each correspondingly numbered *n*th first control means to its second stable state, where each alternately numbered 1 to N−1 tenth means has a first control input responsive to each control signal generated on one lead of said second lead pair, each alternately numbered 2 to N tenth means has a first control input responsive to each control signal generated on the other lead of said second lead pair, and each said *n*th tenth means has at least a second control input conditioned by the first state of the $n+1$th fourth means.

11. A circuit according to claim 6 wherein is further included, a first control lead for each information channel sixth means individually connected thereto for generating a control signal thereon in response to each information bit signal appearing on the information channel, a second control lead for each information channel and seventh means individually connected thereto for generating a control signal thereon in response to each information bit signal appearing on the information channel, where the control signal on said second control lead is delayed in time with respect to the control signal on said first control lead, a bistable second control means for each information channel, each said second control means being set to a first stable state by a control signal on the channel first control lead, a multi-control input eighth means for each information channel acting, when any one of its control inputs is conditioned, to set the said second control means for the information channel to a second stable state, where each said eighth means has control inputs thereof respectively conditioned by operation of each said second means for the information channel, and a multi-control input ninth means for each information channel acting to generate an error signal when all of its control inputs are conditioned, where each said ninth means has a first control input conditioned by the first stable state of the said second control means for the information channel, and a second control input conditioned by a control signal appearing on the channel second control lead.

12. A circuit according to claim 11 wherein is further included, a second pair of leads, eleventh means connected thereto for generating control signals alternately thereon in response to operation of said fifth means, and a like number N of multi-control input tenth means common to all of the information channels, each said *n*th tenth means acting, when all of its control inputs are conditioned, to set each correspondingly numbered *n*th first control means to its second stable state, where each alternately numbered 1 to N−1 tenth means has a first control input connected to be conditioned by each control signal generated on one lead of said second lead pair, each alternately numbered 2 to N tenth means has at least a second control input conditioned by the first state of the $n+1$th fourth means.

13. A circuit according to claim 12 wherein each *n*th eleventh means is further connected to clear each correspondingly numbered *n*th storage means.

14. A circuit for receiving sequentially applied signal sets each comprising related parallel information bit signals, where each information bit signal of the same signal set appears on a different one of a group of information channels, which circuit comprises in combination:

(a) an in-control circuit means, said in-control circuit means comprising, a first pair of leads for each information channel, and first means individually connected to each said first lead pair for generating control signals thereon in response to information bit signals appearing on the information channel;

(b) deskew register means comprising, an even number N of at least four bistable first control means for each information channel;

a like number N of multi-control input second means for each information channel, each said *n*th second means for the same information channel acting, when all of its control inputs are conditioned, to set the correspondingly numbered *n*th first control means for the same information channel to a first stable state, where each alternately numbered 1 to N−1 second means for the same information channel has a first control input responsive to each control signal generated on one lead of said channel first lead pair, and each alternately numbered 2 to N second means has a first control input responsive to each control signal generated on the other lead of said channel first lead pair, a like number N of bistable storage means for each information channel a like number N of multi-control input third means for each information channel, each said *n*th third means for the same information channel being connected and capable of acting, when all of its control inputs are conditioned, to set the correspondingly numbered *n*th storage means for the information channel to a stable state representing an information bit value on the information channel, where each said *n*th third means for the same information channel has a first control input conditioned by a second stable state of the correspondingly numbered *n*th first control means for the information channel, and each said *n*th third means and the correspondingly numbered *n*th second means for the same information channel has a second control input conditioned by the first stable state of the *n*−1th first control means for the information channel and a third control input conditioned by the second stable state of the *n*+1th first control means for the information channel;

(c) rank control means comprising, a like number N of multi-control input fourth means common to all of the information channels, each said fourth means having either a first state or a second state according respectively to whether all or less than all of its control inputs are conditioned, where each said *n*th fourth means has control inputs thereof respectively by the first stable state of each correspondingly numbered *n*th first control means in all of the information channels; and a like number N of multi-control input fifth means common to all of the information channels, each said *n*th fifth means acting, when all of its control inputs are conditioned, to sense the state of each correspondingly numbered *n*th storage means in all of the information channels, where each said *n*th fifth means has at least a first control input conditioned by the first state of the correspondingly numbered *n*th fourth means, a second control input conditioned by the first state of the *n*+1th fourth means, and a third control input conditioned by the second state of the *n*−1th fourth means.

15. A circuit according to claim 14 wherein is further included, a second pair of leads, eleventh means connected thereto for generating control signals thereon in response to operation of said fifth means, and a like number N of multi-control input tenth means common to all of the information channels, each said *n*th tenth means acting, when all of its control inputs are conditioned to set each correspondingly numbered *n*th first control means to its second stable state, where each alternately numbered 1 to N−1 tenth means has a first control input responsive to each control signal generated on one lead of said second lead pair, each alternately numbered 2 to N tenth means has a first control input responsive to each control signal generated on the other lead of said second lead pair, and each said *n*th tenth means has at least a second control input conditioned by the first state of the *n*+1th fourth means.

References Cited

UNITED STATES PATENTS

| | | | |
|---|---|---|---|
| Re. 25,527 | 3/1964 | Floros | 340—174.1 X |
| 3,206,737 | 7/1965 | Lee et al. | 340—174.1 |
| 3,281,805 | 10/1966 | Perry | 340—174.1 |
| 3,286,243 | 11/1966 | Floros | 340—174.1 |

OTHER REFERENCES

A. L. Scherr and M. F. Heilweil, "A System for Deskewing Tape Signals," IBM Technical Disclosure Bulletin, vol. 6, No. 8, January 1964.

MALCOLM A. MORRISON, Primary Examiner

U.S. Cl. X.R.

235—153; 340—174.1

UNITED STATES PATENT OFFICE

CERTIFICATE OF CORRECTION

Patent No. 3,456,237 July 15, 1969

David M. Collins

It is certified that error appears in the above identified patent and that said Letters Patent are hereby corrected as shown below:

Column 16, line 46, "conrtol" should read -- control --. Column 18, line 50, after "has" insert -- a first control input connected to be conditioned by each control signal generated on one lead of said second lead pair, each alternately numbered 2 to N tenth means has --. Column 19, line 44, after "respectively" insert -- conditioned --.

Signed and sealed this 30th day of June 1970.

(SEAL)
Attest:

Edward M. Fletcher, Jr.
Attesting Officer

WILLIAM E. SCHUYLER, JR.
Commissioner of Patents